A. PENTECOST AND W. W. FISHER.
CALCULATING MACHINE.
APPLICATION FILED MAY 22, 1920.

1,433,908.

Patented Oct. 31, 1922.
6 SHEETS—SHEET 3.

A. PENTECOST AND W. W. FISHER.
CALCULATING MACHINE.
APPLICATION FILED MAY 22, 1920.

1,433,908.

Patented Oct. 31, 1922.

INVENTORS.
Arthur Pentecost
and
William W. Fisher
BY
Ralph L. Warfield
ATTORNEY

A. PENTECOST AND W. W. FISHER.
CALCULATING MACHINE.
APPLICATION FILED MAY 22, 1920.

1,433,908.

Patented Oct. 31, 1922.
6 SHEETS—SHEET 5.

INVENTORS
Arthur Pentecost and
William W. Fisher
BY
Ralph E. Warfield
ATTORNEY

A. PENTECOST AND W. W. FISHER.
CALCULATING MACHINE.
APPLICATION FILED MAY 22, 1920.

1,433,908.

Patented Oct. 31, 1922.
6 SHEETS—SHEET 6.

Fig. 8.

INVENTORS
Arthur Pentecost and
William W. Fisher
BY
Ralph S. Warfield
ATTORNEY

Patented Oct. 31, 1922.

1,433,908

UNITED STATES PATENT OFFICE.

ARTHUR PENTECOST, OF NEW YORK, N. Y., AND WILLIAM W. FISHER, OF ORANGE, NEW JERSEY, ASSIGNORS TO WALES ADDING MACHINE COMPANY, OF WILKES-BARRE, PENNSYLVANIA, A CORPORATION OF PENNSYLVANIA.

CALCULATING MACHINE.

Application filed May 22, 1920. Serial No. 383,461.

*To all whom it may concern:*

Be it known that we, ARTHUR PENTECOST, a subject of the King of England, residing at New York, New York County, New York, and WILLIAM W. FISHER, a citizen of the United States, and a resident of Orange, Essex County, New Jersey, have jointly invented certain new and useful Improvements in Calculating Machines, of which the following is a specification.

Our invention relates more particularly to improvements in multiple counter calculating machines, wherein registrations of amounts set up on a single keyboard may be effected on any of two or more sets of counters, and is a divisional part of our original application filed July 17, 1918, Serial Number 245,273, in respect to which United States Letters Patent, No. 1,355,258, issued October 12, 1920.

In the particular mechanism set forth, such registrations take place on either of two sets of counters, but our improvements are not restricted in their application to this class of machine, and may be applied to machines adapted for accumulation on two or more sets of counters simultaneously or successively during a single operation of the machine.

Furthermore, the invention is applicable to single as well as multiple counter machines.

The accumulation of amounts on one or another of the several sets of counters is determined by a counter-selecting lever adjustable to various positions, to release or free the selected set of counters for operation, and lock the remaining set or sets of counters out of operation.

One object of our invention is to provide novel and simplified carrying mechanisms for the respective sets of counters.

Another object is to provide a single carry-resetting mechanism common to at least two of the carrying mechanisms.

The carrying or transfer mechanisms are of that type operable to effect the carry during the period of disengagement of the counters and drive members, and still another object is to provide an improved combined carrying and counter control mechanism of simple and efficient character.

In carrying mechanisms of this general type, the carry occurs near the end of the return stroke of the main drive shaft, after the counters have disengaged from the drive members, and in some instances the discharged carrying members have been reset at the beginning of the succeeding forward stroke.

Thus, the actual carry from a counter of lower order to one of the next higher order will take place after the disengagement of the drive members and counters near the end of the return stroke of the main drive shaft, and must be completed prior to the operation of the carry-resetting mechanism. In cross-carrying operations when the main drive shaft is rapidly operated, the carrying wave tends to continue during a part of the succeeding forward stroke of the shaft, and when the carry-resetting mechanism operates at the beginning of the forward stroke, such wave is liable to be interrupted, and an erroneous registration results. The time within which such carrying may be effected need be limited only by the necessity for disengaging the counters from their carrying members and engaging the counters with their drive members in time to enable the drive members to register on the counters, the amounts set up on the keyboard, and provision made for resetting the carrying members during the engagement of the counters and their drive members.

In order, therefore, to permit as much time as possible during which transfers may be effected, the operation of the carry-resetting mechanism in this invention, is delayed until the end of the forward stroke, at which point the counters are disengaged from the carrying members, in adding operations.

In a machine employing a plurality of accumulators with selective means to determine which set of accumulators shall be operative and which shall remain idle, it will often occur that one set of counters will be held idle after accumulating an amount thereon, during which accumulation, transfers have taken place in one or more orders. In such event, the counters will remain engaged with their respective combined carrying and counter control members, while one or more of the members is in discharged position. The idle set of counters will register the correct accumulation, but certain of the carrying members may be left in discharged position, at this time. If the discharged carrying members associated with the idle set of counters were reset, their counters would be reversely rotated to effect an incorrect registration, and possibly result in injury to the machine.

Another object of our invention, therefore, is to provide, in combination with a single carry-resetting mechanism for the carrying members of the respective sets of counters, means whereby, when the operator shifts from one accumulator or set of counters to another, the discharged carrying members, if any, coacting with the idle set of counters will not be reset until the operator again selects such set of counters for operation, and operates the machine. To this end, we have arranged a neat, compact and accurate carrying mechanism which is effective in operation and comprises a minimum of parts.

The foregoing and other objects and advantages will be more fully set forth hereinafter and particularly pointed out in the claims.

In the accompanying drawings.

Our improvements are herein illustrated as applied to calculating machines of that type shown in United States Letters Patent to Wales, No. 797,032, August 15, 1905; McFarland, No. 842,232, January 29, 1907; White, No. 940,766, November 23, 1909; Bickford, No. 1,086,580, February 10, 1914 and No. 1,112,516, October 6, 1914, to which reference is made for a more complete understanding of the various constructions and the functions thereof, than is herein set forth.

Figure 1:
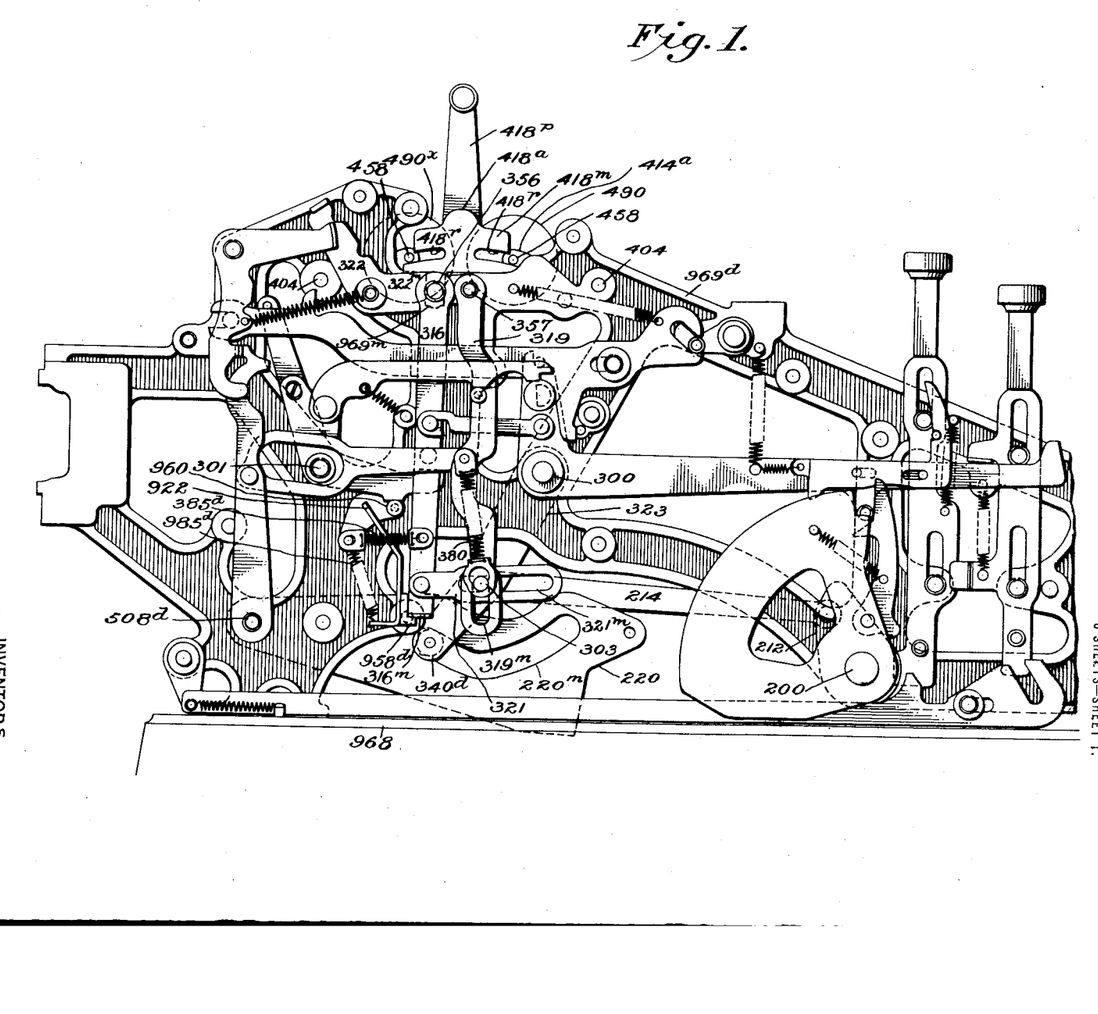
Fig. 1 is a view in side elevation of the well-known Wales machine, equipped with one embodiment of our invention, parts being omitted, the parts shown being in idle position.
Figure 2:
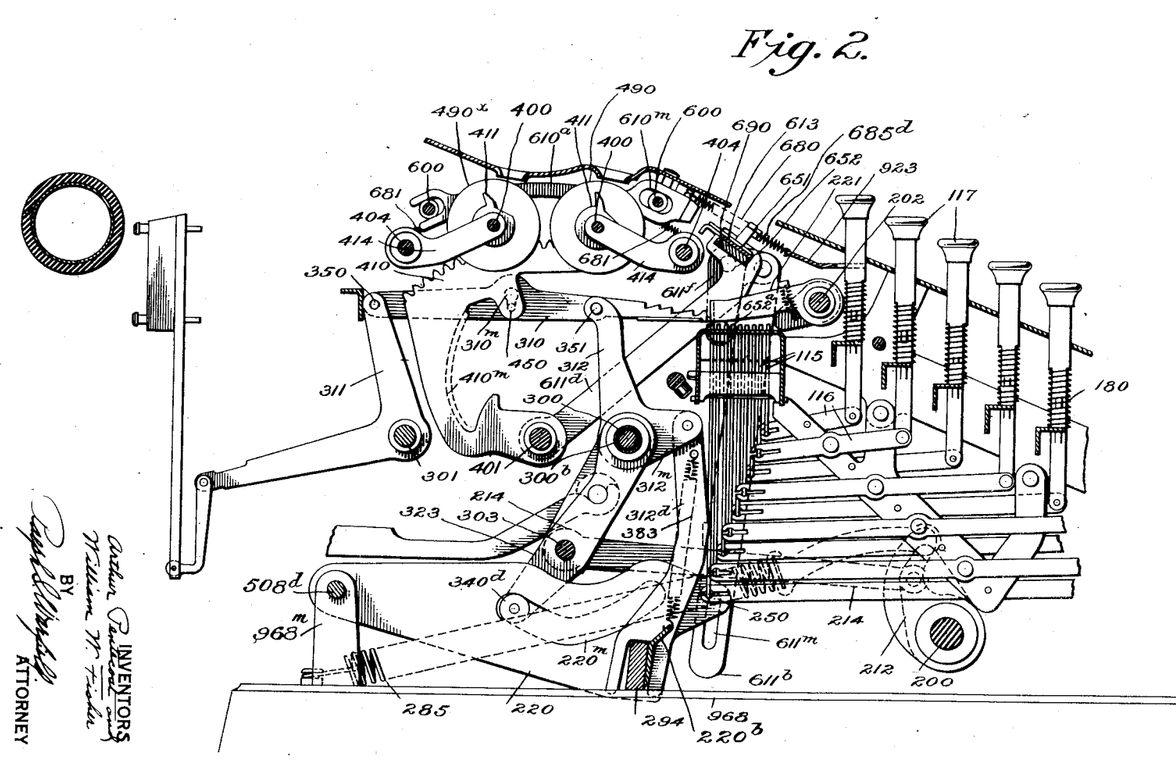
Fig. 2 is a longitudinal sectional view looking towards the right hand side of the machine, parts also being omitted from this view.

Referring to Figs. 1 and 2, a base 968 supports side frames 969$^d$, between which are arranged from front to back, a keyboard, or selective mechanism, an accumulating mechanism, and a printer mechanism, respectively.

Keyboard.

The similar keys 117 (Fig. 2) of the keyboard, are arranged in denominational rows, preferably according to the decimal system, and operate individual levers 116 to control corresponding stops 115 arranged in similar denominational rows along the paths traversed by positioning bars 310, (Figs. 2, 3 and 4), constituting part of the accumulating mechanism.

Depressing any of the keys 117 against the tension of its restoring spring 180, rocks its lever 116 to set its respective stop 115, in the corresponding denominational row of stops. The stops 115 of the denominational rows, when set, project into the paths of the series of positioning bars 310, which correspond denominationally with the rows of keys and stops, to determine the digits to be accumulated on the respective denominational counters 490 or $490^x$.

Accumulating mechanism.

Front arms 312 journaled on a tube $300^b$ extending across the machine and seated at its ends in the side frames $969^d$, pivotally support the front ends of the longitudinally extending positioning bars 310 at points 351. Rear arms 311 journaled on the cross rod 301 pivotally support the positioning bars at points 350.

Segmental racks or drive members 410 (Figs. 2, 3 and 4) whose stocks $410^m$ are journaled on a cross shaft 401 located intermediate the cross rod 301 and tube $300^b$, are pivotally connected by the headed studs 450 to their corresponding positioning bars 310.

It will be noted that the positioning bars are adapted to have a general rectilinear forward and backward travel, whereas the drive members 410, which are pivotally supported substantially on a plane with the pivotal supports of the arms 312 and 311, travel in an arc, and to enable the drive members 410 and positioning bars 310 to coact in spite of this difference in their paths, the distance between the center of the tube $300^b$ and the pivot point 351; and the distance between the center of the cross rod 301 and the pivot point 350, is conveniently made to correspond to the distance between the center of the rack-supporting cross shaft 401 and the pivot stubs 450 connecting the racks 410 and positioning bars 310. The distance between the intermediate shaft 401 and either the cross tube $300^b$ or cross rod 301 corresponds to the distance between the pivot stud 450 and either of the pivot points 350 or 351. Consequently, there is no vertical motion of the studs 450 relatively to the positioning bars 310.

For convenience in assembling and disassembling, the pivot studs 450 are shown seated in keyhole slots $310^m$ in the positioning bars 310, but such slots are not necessary to the proper cooperation of the racks and positioning bars.

Depending restoring links $312^d$ (Fig. 2) pivotally connected to short forward extensions $312^m$ of the several front arms 312, are forked at their lower ends to embrace a transversely extending restraining and restoring bar 294 mounted in and connecting the forward ends of a pair of levers 220 journaled at their rear ends on the fulcrum shaft $508^d$ extending between the side frames $969^d$. Posts $968^m$ projecting upwardly from the base 968 support the fulcrum shaft intermediate its ends.

The forked ends of the links $312^d$ are guided by slots in a guide plate $220^b$ fastened to and projecting above the restraining and restoring bar 294, and springs 383 (Fig. 2) connected to the links $312^d$ and to the guide plate, tend to advance the positioning bars 310 against the stops 115.

Suspension bars 323 journaled on the cross tube $300^b$ carry rolls $340^d$ entered in cam slots $220^m$ (Figs. 1, 2, 3 and 4) formed in the levers 220.

Draft links 214 connect the suspension bars 323 with cranks 212 fixed on the main drive shaft 200 journaled near the base in the forward ends of the side frames $969^d$.

The usual main spring 285 (Fig. 2) connected to the main drive shaft, restores the latter, and its connected parts to, and retains them in, home position.

Figure 3:
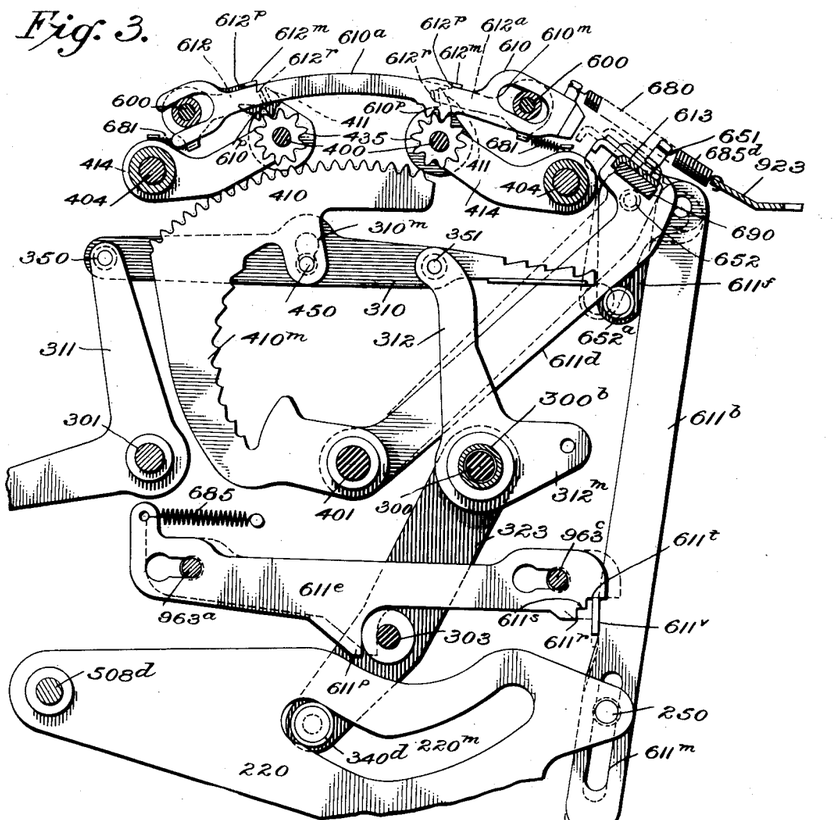
Fig. 3 is an enlarged detail side view of the accumulating mechanism and cooperating parts, showing in full lines the carry or transfer mechanism in its normal set or cocked position, the parts being at rest; and in dotted lines, the position assumed by the carry-resetting member during the return stroke of the main drive shaft, to delay the complete operation of the carrying members until the counters are engaged therewith.

Normally the rolls $340^d$ lie at the rear ends of the cam slots $220^m$, as shown in Figs. 2 and 3, to retain the restraining and restoring bar 294 at one end of its travel, and hold the positioning bars 310 and the drive members 410 in their retired positions.

The cross tube $300^b$ surrounds a cross shaft 300, journaled in the side frames $969^d$. The tube strengthens the frame and imparts added rigidity thereto. Furthermore, by mounting the front supporting arms 312 and the suspension bars 323 on the tube, the cross shaft 300 is relieved of the strain caused by the tension of the drive springs 383 acting upon the short arms $312^m$, to advance the positioning bars 310 and racks 410, as well as the tension of the main spring 285 operating through the main drive shaft 200, and draft links 214 on the suspension bars 323.

Multiple counters and supporting devices.

The denominational counters 490, $490^x$ (Fig. 2) of which there may be two or more sets, coact with the drive members 410.

In the present instance, we have shown two sets of counters or accumulators, the forward set 490, of which may be called, for convenience, the "Debit" set, and the rearward set of counters $490^x$, the "Credit" set. As both sets are substantially similar, a description of one will suffice for both, and reference will be made to any differences. Each accumulator includes several counters loosely mounted for independent rotation on an axle 400 carried by several supporting arms 414 fast on a cross bar 404 extending between the side frames. The respective series of arms 414 project toward each other from the respective parallel cross bars 404, to locate the respective debit and credit accumulators parallel with and adjacent each other. Pinions 435 fast with the respective counters, are adapted to mesh with the corresponding racks or drive members 410.

Normally, the counters 490, $490^x$ of both accumulators occupy the elevated positions shown in Figs 1, 2, 3, and 6, in which the pinions 435 are disengaged from the racks 410.

Much of the description of parts immediately following, will be found in the well-known Wales machine, and is disclosed in United States patents to Wales, No. 797,032, August 15, 1905, and to McFarland, No. 842,232, January 29, 1907.

In the present construction, the right hand ends of the axles 400 project beyond the counters 490, 490$^x$ of lowest denomination (see Figs. 8, 10 and 11) of the respective accumulators and rest loosely upon the vertically shiftable head 324 of a counter-disengaging and supporting plate arranged adjacent the right hand side frame 969$^d$ of the machine. The left hand ends of the axles 400 terminate short of the left hand side frame, to afford room for the throw of the subtraction lever (not shown). Therefore, to provide supporting means for the left hand ends of the respective sets of counters, the left hand ends of the parallel cross bars 404 carry arms 414$^a$ (Fig. 8) secured thereto and lying parallel with the associated axle-bearing arms 414. The arms 414$^a$ extend towards each other, and have outwardly projecting lateral studs 548 which lie in alinement with the respective front and rear axles 400, and rest upon a vertically shiftable counter-disengaging and supporting head 324 adjacent the left hand side frame 969$^d$, similar in all respects to the right hand head 324, thus providing similar controlling means for both ends of the sets of counters. The heads of the respective plates 324 are of sufficient extent to lie beneath and support all of the axles 400 and the studs 458 on the opposite sides of the machine. The depending stems 324$^m$ (Fig. 9) of these plates are forked to embrace and be guided by a shaft 402 journaled in the side frames 969$^d$. The counter-disengaging and supporting mechanism is the same on both sides of the machine.

Oppositely located ears 324$^p$ on the stems 324$^m$ of the respective sustaining and counter-disengaging plates 324, pivotally support pairs of upwardly-extending hooks or latches 324$^b$. Corresponding latches on each plate are adapted to engage the projecting stud 458 and the axle 400, respectively, of the particular set of counters selected for operation, to thereby connect the counters and sustaining plates.

These latches will be hereinafter referred to, in connection with the counter-selecting mechanism.

Studs 356 (Fig. 1) project outwardly from the respective supporting plates 324, and through vertical guide slots 969$^m$ in the side frames 969$^d$. These studs pass through arms 322$^m$ of bell crank levers 322 pivoted to the outer faces of the respective side frames.

Props 319 pivoted to the arms at 357, normally support the arms 322$^m$ in their elevated positions.

The props 319 are slotted at their lower ends, at 319$^m$ to embrace and rest upon a trip rod 303 mounted in the suspension bars 323. The trip rod and suspension bars form a swinging frame, the draft links 214 being connected to the trip rod to oscillate the frame forwardly and backwardly.

After the proper keys 117 (Fig. 2) have been depressed to set up the desired stops 115 corresponding to the amount to be registered, the main drive shaft 200 is turned forwardly against the tension of the main spring 285 to swing the suspension bars 323 forwardly (Fig. 4) and cause the rolls 340$^d$ thereon to traverse the cam slots 220$^m$, and rock the levers 220 downwardly. The levers 220, in turn, withdraw the restraining and restoring bar 294 (Fig. 2), which tensions the drive springs 383 and causes the actuating links 312$^d$ to swing the arms 312 forwardly, the links 312$^d$ following and being guided by the bar 294 and plate 220$^b$. The arms 312 advance the positioning bars 310, together with the drive members 410 thereto connected, until the positioning bars are arrested by the projected stops 115, or by denominational rack detents 221 (Fig. 2) journaled on a cross shaft 202, which detents normally lie in the paths of their denominational positioning bars, and are respectively displaced by the corresponding denominational stops 115 as the latter are set.

The arrest of the positioning bars occurs prior to the completion of the downward throw of the restraining and restoring bar 294, the additional travel of which operates to further tension the drive springs 383. The forked ends of the links 312$^d$ are sufficiently long to maintain contact with the bar or with the guide plate 220$^b$ throughout the full travel thereof.

The suspension bars 323 (Fig. 1), on such forward stroke, advance the trip rod 303, which first travels in a descending arc. This travel, by relieving the props 319 of support, would permit the engagement of the counters 490 and racks 410 at the beginning of the forward stroke, before the racks have advanced, to prevent which, in adding operations, the studs 356 carry depending legs 316 (Fig. 1) the feet 316$^m$ of which contact angular seats 958$^d$ to maintain the supporting plates 324 elevated and the counters 490 disengaged from their racks 410.

The ends of the trip rod 303 enter slots 321$^m$ in links 321 pivoted to the legs 316, and as the rod 303 advances, it idly traverses the slots 321$^m$ in the links 321 and shifts along the slots 319$^m$ in the props 319 (which are held suspended by the legs 316 and seats 958$^d$) to afford time for the positioning bars 310 to advance against the key-set stops 115, or against the rack detents 221.

By the time the trip rod 303 has reached the outer ends of the slots 321$^m$, the bars 310 have reached their advanced positions, and the rod now draws the links 321 forwardly to disengage the legs 316 (against the tension of restoring springs 385$^d$) from the seats 958$^d$, and thereby release the arms 322$^m$, which thus deprived of support, swing downwardly to enable the supporting plates 324, together with the counters 490 and pinions 435, to drop, meshing the pinions with the racks 410, (as shown at the left in Fig. 4) preparatory to registering the amounts represented by the advanced racks, on the counters.

Springs 380 (Fig. 1) connecting the props 319 and the trip rod 303, and tensioned by the latter on its advance, operate to snap the counters into mesh with their racks.

The seats 958$^d$ are swivelled in their respective side frames 969$^d$ and as the feet 316$^m$ are withdrawn therefrom, they trip the seats forwardly, aided by springs 985$^d$ connected to the seats, in position to accommodate the feet upon the restoration of the latter, and take up clearance between the feet and seats, which would otherwise permit a partial descent of the counters at the beginning of the forward stroke.

Stop arms 922 projecting from the seats 958$^d$ strike abutments 960 on the respective side frames 969$^d$ to arrest the seats in tilted position.

The main drive shaft 200, on its return stroke, restores the trip rod 303 and the suspension bars 323, (Fig. 2), the rolls 340$^d$ of which retrace their paths in the slots 220$^m$ of levers 220, to return the levers and press the restraining and restoring bar 294 against the actuating links 312$^d$, which followed the restoring bar on its downward stroke. The actuating links are thus forced upwardly to return the positioning bars 310 and toothed members 410 to their home positions. During such retirement, the advanced racks 410 turn the counters 490, or 490$^x$ to register thereon the amount represented by the depressed keys 117.

The trip rod 303, during the first part of its return stroke, idly traverses the slots 319$^m$ in the props 319, and 321$^m$ in the links 321, to afford time for the racks 410, as they retire, to register amounts on the counters.

As the trip rod begins its upward swing, at which time the racks have been restored, it contacts the upper ends of the slots 319$^m$ (Fig. 1) of the props 319 to force them upwardly and rock the arms 322$^m$, which raise the supporting plates 324 to disengage the counters 490 or 490$^x$ from the racks or drive members 410.

The arms 322$^m$, as they rise during the return stroke of the main drive shaft, lift the legs 316 until the feet 316$^m$ clear the seats 958$^d$, whereupon, the superior springs 385$^d$ tensioned by the advance of the legs when the links 321 were pulled forwardly by the trip rod 303 at the end of the forward stroke, snap the feet against the backs of their seats, to restore the latter to upright position against the tension of the inferior tilting springs 985$^d$, to take up the clearance between the seats and feet. By this means, the counters are supported against any material descent, during the advance of the positioning bars 310 and racks 410, until the legs 316 are tripped. This arrangement permits a reduction of the distance through which the counters drop to mesh with the racks, and renders the mechanism even more accurate than heretofore.

The depressed keys 117 are released on the return stroke to the action of their restoring springs 180 which also return the projected stops 115, by means substantially like that disclosed in United States patents to Wales, No. 797,032, August 15, 1905, and McFarland, No. 842,232, January 29, 1907, to which reference is made for a more complete understanding of the mechanism, and the rack detents 221 return to normal effective positions, shown in Fig. 2.

*Carrying or transfer mechanism.*

Turning of any of the counters 490 of lower demonation from its "9" position, to its "0" position in adding by the decimal system, necessitates the transfer of "1" to the counter of next higher order, to accomplish which we have devised a simple yet highly efficient counter-controlled carrying mechanism independent of the racks, and effective also to prevent accidental rotation of the counters during their disengagement from the racks.

Figure 6:
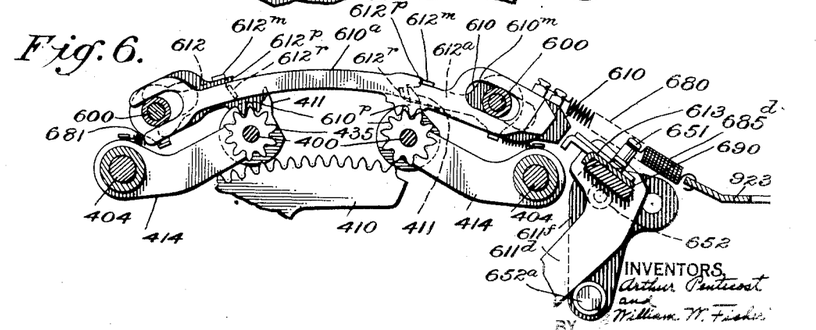
Fig. 6 is a similar view, showing the carry effected, the resetting member having retired to its normal idle position.
Figures 7, 9, 10, 11:
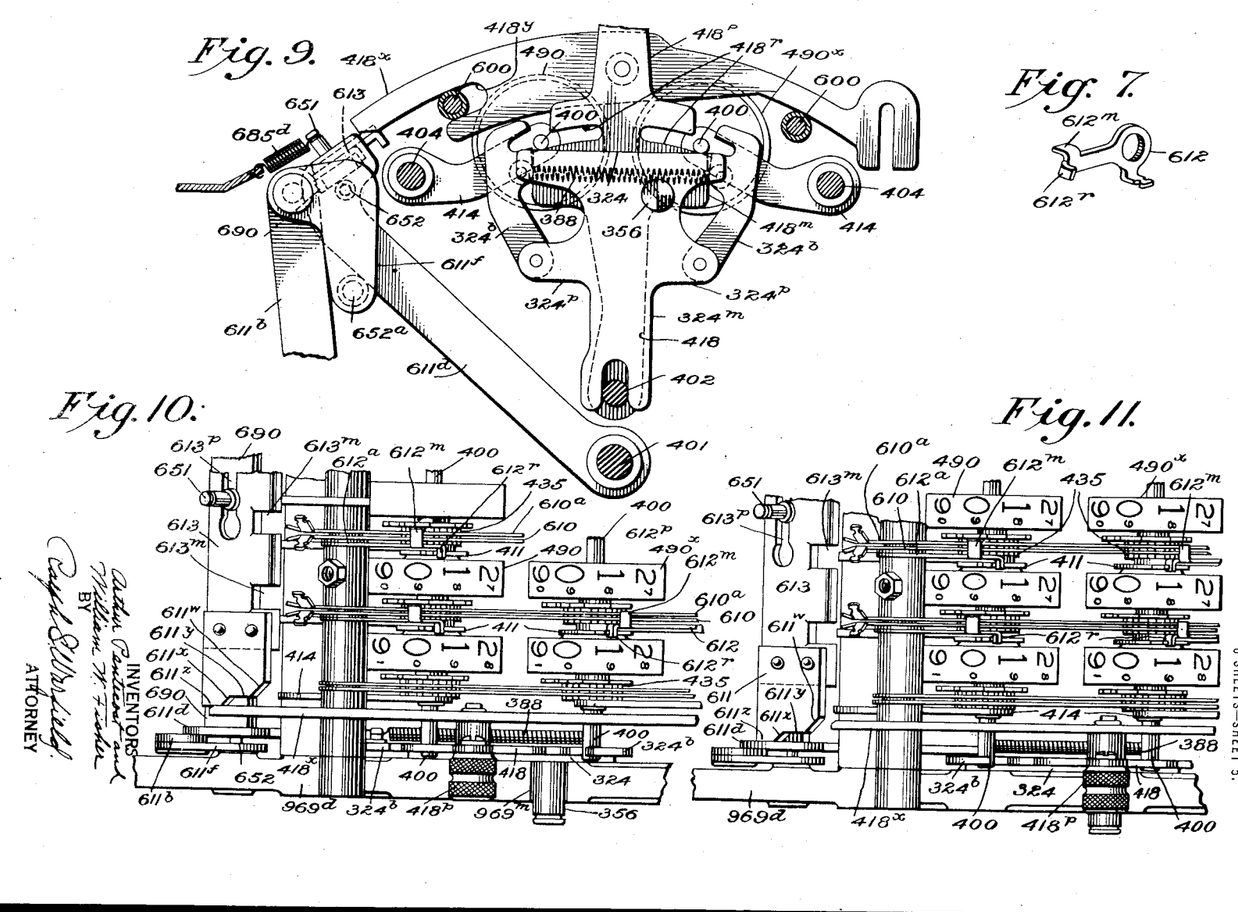
Fig. 7 is a detail perspective view of one of the latches 612 which retains the carrying member 610 in set position and also arrests its counter 490 in zero position.
Fig. 9 is a detail side view of the counter-selecting mechanism, showing its control of the carry-resetting member, the counter-selecting mechanism being in its non-add position.
Figs. 10 and 11 are fragmentary plan views, showing the positions assumed by the carry-resetting member relatively to the sets of carrying members when the counter-selecting mechanism is in either of its extreme positions.
Figure 8:
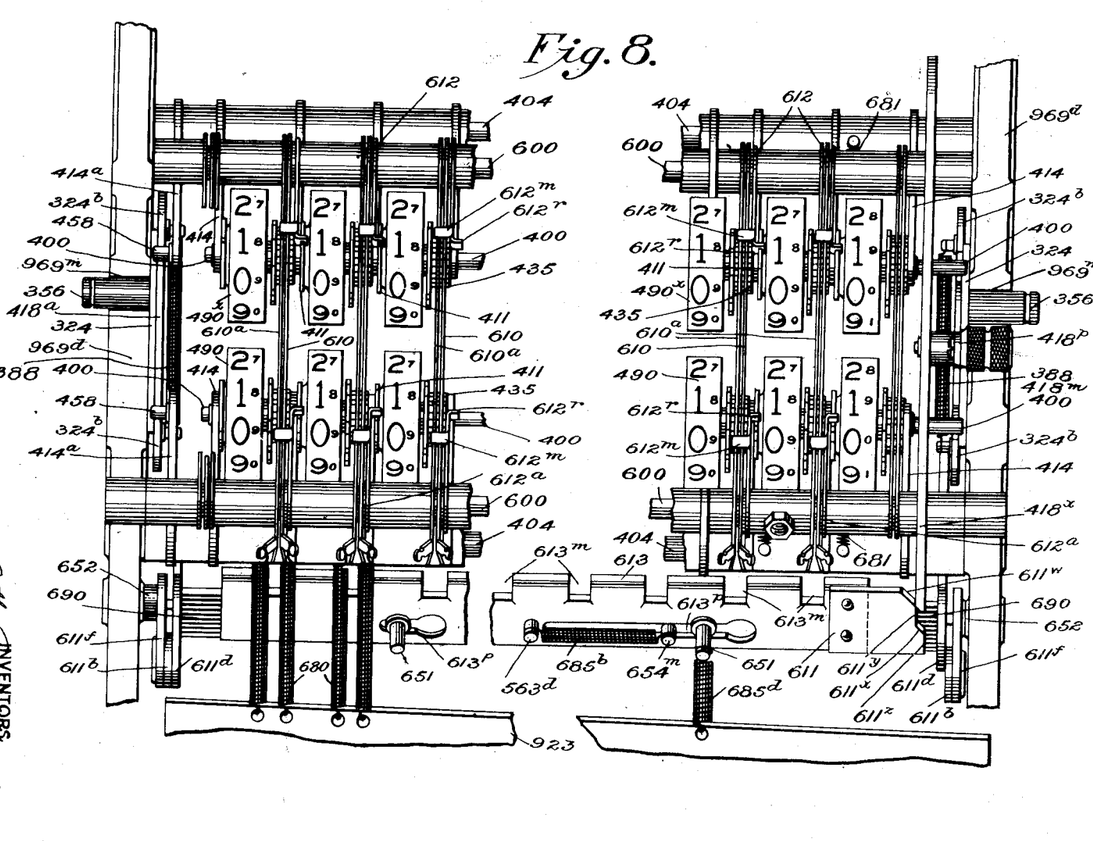
Fig. 8 is a plan view, partly broken away, and with parts omitted, to show the carrying members for the respective sets of counters, and the carry-resetting member common to the several carrying members; also the control of the carry-resetting member by the counter-selecting lever, the resetting member being in its ineffective position which it occupies when the counter-selecting mechanism is in its non-add position wherein it restrains all sets of counters against operation.

The corresponding denominational counters of the respective sets of accumulators mounted on their separate axles 400, lie in alinement (Figs. 8, 10, and 11). Carrying bars or members 610, 610$^a$ (Figs. 2–6, 8, 10 and 11) are arranged in pairs longitudinally of the machine, and are slidably supported for endwise travel on parallel cross rods 600, extending between the side frames and located, respectively, in front of the forward set of counters 490, and behind the rear set of counters 490$^x$. The rear ends of the carrying members 610, 610$^a$ are bifurcated to embrace the rear rod 600 for guidance, the front ends of the carrying members being slotted, as at 610$^m$, through which slots, the front cross rod 600 extends. The carrying members 610$^a$ coact with the corresponding denominational counters 490 of the front set, short, toothed racks 610$^p$ being formed on the lower edges of the carrying members and near their forward ends, with which the pinions 435 of the front set of counters normally engage. The pinions, and consequently their counters, are thus held against accidental rotation, when disengaged from their drive members 410, (Figs. 3-6), the short racks 610$^p$ serving as counter control means for this purpose.

Carrying members 610 coact with the corresponding denominational wheels 490$^x$ of the rear set of counters, and are provided with similar short racks 610$^p$ located near their rear ends with which the pinions 435 of the rear set of counters normally engage.

The sets of carrying members operate in exactly the same manner to accomplish the same results, but are entirely independent of each other.

Detents 612 (Figs. 3-8, 10 and 11) journaled on the rear cross rod 600 adjacent the carrying members 610, have lateral lugs 612$^m$ extending over and resting upon the upper edges of the carrying members, in the paths of shoulders 612$^p$ on such members, to retain the members in normal position against the tension of springs 680 attached to the front ends of the bars 610, 610$^a$ and to an anchor plate 923 extending between the side frames. The springs 680 tend to advance the carrying members 610, 610$^a$. Lateral ears 612$^r$ on the detents extend oppositely to the lugs 612$^m$, into the paths of cams 411 fixed to turn with the respective counters 490$^x$.

Detents 612$^a$, similar to detents 612, and provided with lugs 612$^m$ and ears 612$^r$, are journaled on the front cross rod 600 to cooperate with the carrying bars 610$^a$ of the front series of counters, and with cams 411 on the front counters 490, in like manner. Springs 681 connected to the respective detents 612, 612$^a$, yieldingly maintain the lugs 612$^m$ in contact with the upper edges of the carrying members 610, 610$^a$.

When any of the counters 490, 490$^x$ (with the exception of the counter of highest denomination) turns from its "9" to its "0" position, its cam 411 wipes against the corresponding ear 612$^r$ of its detent 612, or 612$^a$ to swing the detent upwardly against the tension of its retaining spring 681, thereby displacing the lug 612$^m$ from in front of the shoulder 612$^p$ to free the carrying bar which cooperates with the counter pinion 435 of next higher order, to the action of its spring 680.

Fig. 3 shows the front and rear sets of counters engaged with their respective combined carrying bars and counter control members 610, 610$^a$ which is the normal position of the parts prior to the forward stroke.

The full line positions of the tripping cams 411 indicate that both sets of counters are cleared or registering zeros.

The dotted line position of the cam 411 of the rear set of counters 490$^x$ indicates the position assumed when the counter registers "9".

Figure 4:
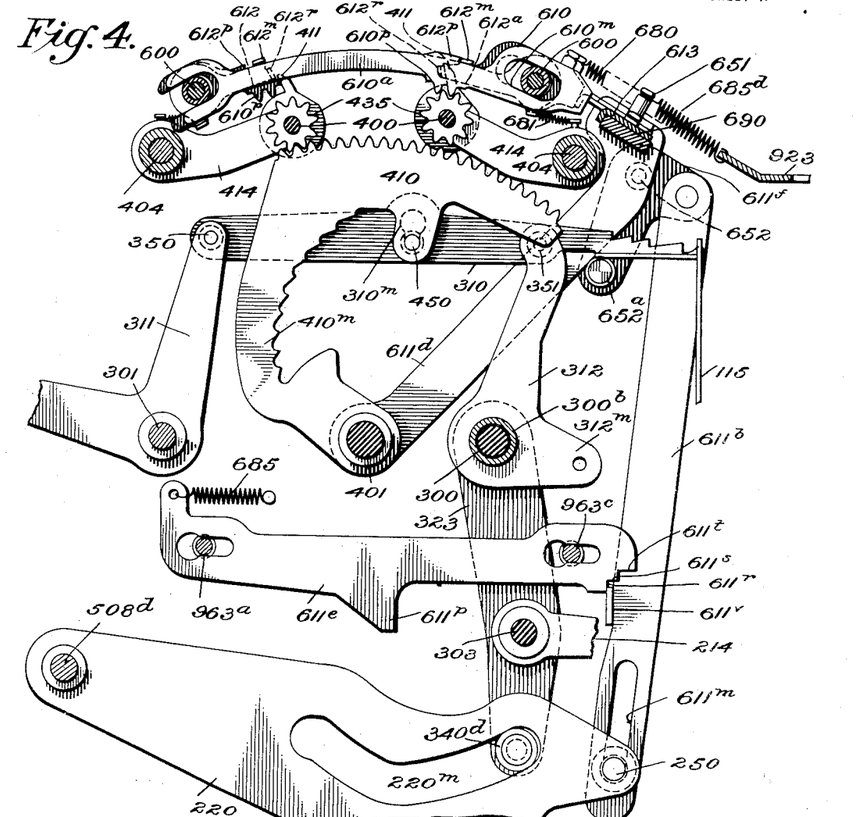
Fig. 4 is a similar view, showing the positions of the parts at the end of the forward stroke, the carry-resetting member being in that one of its extreme positions in which it has reset the discharged carrying members of the active set of counters, all sets of counters being clear.

Fig. 4 shows the positions of the parts at the end of the forward stroke, during an adding operation, the rack 410 having advanced until arrested by the key-set stop 115, in position to accumulate "9" on the rear counter 490$^x$, which has just dropped into mesh with its rack, such counter being clear.

The carrying action from one counter to another is initiated only when the counters are in mesh with the adding racks 410 and out of mesh with their carrying racks 610$^p$, and during the retirement of the racks to their home positions.

Obviously, if the carrying bar 610 was permitted to complete its operation at this time (while the pinion is engaged with its drive member 410 and disengaged from the carrying bar and controlling member 610) such operation would be futile. On the other hand, if the carrying bar, when tripped, was held against any advance, the cam 411 which passes out of contact with the lug 612$^r$ as the counter reaches its "0" position, would allow the detent to snap back into its former effective position under tension of the spring 681, and again lock the carrying bar against operation, by the interposition of the lug 612$^m$ in the path of the shoulder 612$^p$. Therefore, we arrange means to permit a slight displacement of the carrying bar 610 when tripped, relatively to its detent, sufficiently to locate its shoulder 612$^p$ beneath the displaced lug 612$^m$ of the detent (Fig. 5) to prevent the detent from resuming its effective position, and then arrest the released carrying bar before it has completed its effective throw, such means also operating to release the bar for complete operation, and to restore the bar to normal set position in readiness to perform another carrying operation.

In following the sequence of operations of the machine, it will be necessary to explain the method of resetting the carry, which operation occurs prior to the carry-delaying operation.

Arms 611$^d$ (Figs. 2, 3 and 4) journaled on the cross shaft 401 near its opposite ends, support a cross rail 690 on which is slidably mounted a carry-delaying and resetting bar 613, one edge of which projects rearwardly beyond the rail 690 in front of the forward ends of the carrying bars 610 and 610$^a$, and is preferably flanged to afford a wide contact face to cooperate with the forward ends of the carrying bars.

Normally, the arms 611$^d$ rest against projecting studs 652$^a$ mounted in the free arms of bell cranks 611$^f$ pivoted to the respective side frames at 652, to support the carry-delaying and resetting bar 613 in its retracted position shown in full lines in Fig. 3, at which time it is farthest removed from the carrying bars 610 and 610$^a$.

The levers 220, heretofore referred to, which control the advance and retirement of the drive members 410, and rock downwardly and then upwardly during the operation of the machine, carry pins 250 at their forward ends, entered in slots 611$^m$ formed in the lower ends of links 611$^b$ connected at their upper ends to the remaining arms of the bell cranks 611$^f$.

During the major portion of the forward stroke, the pins 250 idly traverse the slots 611$^m$ to afford time for the trip rod 303 to trip the counter-supporting mechanism. Just prior to the end of the forward stroke, and immediately subsequent to the engagement of the counters 490 or 490$^x$ with their drive racks 410, and their consequent disengagement from the carrying bars 610, or 610$^a$, the pins 250 contact the lower end walls of the slots 611$^m$ to draw the links 611$^b$ downwardly and rock the bell cranks 611$^f$, the free arms of which, carrying the studs 652$^a$, thrust the latter against the arms 611$^d$ to swing the delaying and resetting bar 613 to the opposite end of its travel, as shown in Fig. 4, and tension the bar-restoring springs 685$^d$ secured at their forward ends to the anchor plate 923. The bar 613 during such operation, strikes the forward ends of such of the carrying bars 610 or 610$^a$ which have been advanced during the previous operation of the machine, to restore the carrying bars, against the tension of the carrying springs 680, while the active counters are disengaged therefrom.

The resetting bar 613 presses the carrying members 610, 610$^a$ rearwardly past their normal locked positions to insure that the shoulders 612$^p$ shall retreat past the lugs 612$^m$ on the detents 612 or 612$^a$ to permit the springs 681 to snap the detents back to effective position with their lugs 612$^m$ in front of the shoulders 612$^p$. Thus, at the end of the forward stroke, all the carrying springs 680 of one set of carrying members, as well as the bar-restoring springs 685$^d$, tend to return the bar 613 to normal position.

At the end of the forward stroke, the counters 490 or 490$^x$ come under the control of the drive racks, and at the beginning of the return stroke, during which latter stroke, the racks 410 retire and turn the counters to add amounts thereon, the pins 250 withdraw from the lower ends of the slots 611$^m$, to enable the restoring springs 685$^d$, aided by the tensioned carrying springs 680, to return the resetting bar 613 towards its normal retracted position.

Immediate restoration of the carry-resetting bar 613 at this period in the operation of the machine, would enable the carrying bars 610 or 610$^a$ tripped by the cams 411 of the counters, to advance while the counters were disengaged therefrom, and consequently the "carry" would be lost.

Hence, the carry-resetting bar is arrested on its return stroke in position to permit a slight advance of the carrying members 610, 610$^a$, when tripped, as follows:

The trip rod 303 (Fig. 3) normally lies in front of and in contact with projections 611$^p$ carried by locking members 611$^e$, slotted to accommodate, and travel back and forth transversely of, the supporting studs 963$^a$ and 963$^c$ extending inwardly from the opposite side frames 969$^d$. The trip rod normally restrains the locking members 611$^e$ against the action of springs 685 which tend to advance the members.

The forward ends of the locking members 611$^e$ are each formed with stepped shoulders 611$^r$, 611$^s$ and 611$^t$, and, as the trip rod 303 advances during the forward stroke, the springs 685 project the locking members 611$^e$ until at the end of the stroke, the lower innermost shoulders 611$^r$ strike lugs 611$^v$ on the links 611$^b$, (see Fig. 4) which lugs enter the paths of the shoulders 611$^r$ as the links are drawn downwardly by the studs 250 and levers 220. At the end of the forward stroke, the lugs 611$^v$ lie below the overhanging shoulders 611$^s$.

On the return stroke, the studs 250 withdraw from the bottoms of the slots 611$^m$ of the links 611$^b$, to free the latter to the tension of the restoring springs 685$^d$, aided by the carrying springs 680, which retract the resetting bar 613 until the links 611$^b$, and consequently the bar 613, are arrested by the contact of the lugs 611$^v$ on the links, with the overhanging shoulders 611$^s$, as shown in dotted lines in Fig. 3, and indicated in Fig. 4.

This partial return of the links 611$^b$ occurs prior to the contact of the restraining and restoring bar 294 (Fig. 2) with the actuating links 312$^d$, and is sufficient to retire the resetting bar 613 from its active resetting position, shown in Fig. 4, to the intermediate position, shown in dotted lines in Fig. 3, and in full lines in Fig. 5, wherein it permits the slight advance of such of the carrying bars 610, 610$^a$ as may be subsequently released by the tripping cams 411 and detents 612 or 612$^a$, when the counters have completed a revolution under the influence of their drive members 410 during the retirement of the latter.

Figure 5:
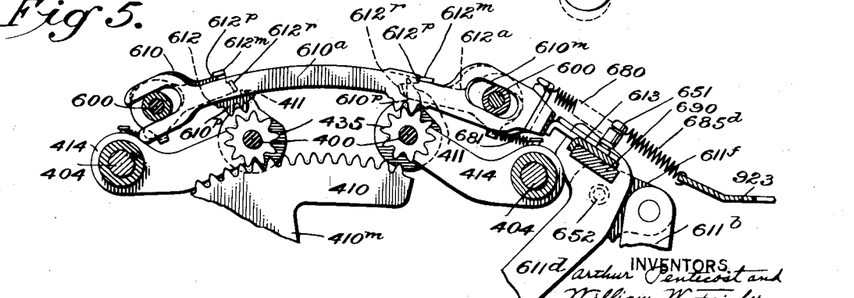
Fig. 5 is a detail view showing in full lines, the intermediate or arresting position of the carry-resetting member, assumed by it at the outset of the the return stroke of the main drive shaft, a carrying member being restrained by the resetting member against complete operation. This is the dotted line position shown in Fig. 4.

Fig. 5 shows the rack 410 retired after having added "1" on a counter 490$^x$ which previously registered "9". The counter, in rotating from its "9" to its "0" position, has caused its cam 411 to trip the corresponding detent 612 and thereby release the carrying member 610 which has advanced through its preliminary travel until arrested by the carry-delaying bar 613, which is in its intermediate position. The view is taken immediately after the rack has added "1" onto the counter and just prior to the disengagement of the rack and counter.

Such slight advance of the tripped carrying bars 610 or 610$^a$ takes place immediately upon the displacement of the detents 612 or 612$^a$ and is sufficient to bring the shoulders 612$^p$ of the bars 613 under the lugs 612$^m$ of the displaced detents, as shown in Fig. 5, to prevent the return of the latter, after their release by the cams 411.

The locking members 611$^e$ maintain the carry-delaying and resetting bar 613 in its intermediate position during the retirement of the drive members 410, which latter arrive at their home positions prior to the completion of the return stroke of the main drive shaft 200, farther movement of which then has no effect on the members 410, owing to the shape of the rear ends of the cam slots 220$^m$. The counters are disengaged from their drive members and engaged with the racks 610$^p$, on the carrying bars 610 or 610$^a$ by the rod 303, during the final return travel of the main drive shaft, after which the trip rod 303, as it completes its return stroke, contacts the projections 611$^p$ to restore the locking members 611$^e$ to normal position, shown in full lines in Fig. 3, thereby freeing the links 611$^b$ to enable the restoring springs 685$^d$ to return the resetting bar 613 to normal retracted position (Figs. 3 and 6).

The springs 685$^d$ also operate through the bar 690 to rock the arms 611$^d$ against the depending arms of the bell cranks 611$^f$ to swing the latter forwardly and thereby lift the links 611$^b$ until the lugs 611$^v$ thereon, strike the overhanging shoulders 611$^t$ to arrest the resetting bar in retracted position.

Such of the carrying members 610 or 610$^a$ as have been tripped by the numeral wheel cams 411, will follow the resetting bar on its withdrawal, due to the tension of carrying springs 680, as shown in Fig. 6, thereby turning their respective counters one step to effect the carry, the bars 610 or 610$^a$ being prevented from turning the counters farther, by contact of the rear ends of the slots 610$^m$ with the front cross rod 600, which serves as an over-rotation preventer for the carrying mechanism.

Fig. 6 shows the position of the tripping cam 411 on the counter 490$^x$ of higher order, after the carrying member 610 has added "1" to the counter which previously stood at zero, the parts being shown in their positions at the end of the return stroke.

The tripped carrying bars remain in discharged position until restored by the resetting bar 613 near the end of the succeeding stroke, as heretofore explained. It will be observed, therefore, that cross or successive carrying operations can be initiated at the end of a return stroke and continue until near the end of the next forward stroke, thus permitting ample time for the completion of the operation when the machine is stroked at high speeds.

Normally, the carrying springs 680 connected to the carrying bars 610, 610$^a$, are under tension to advance the bars or carrying racks, the travel of which is prevented by the carrying detents 612. Hence, the tension of the springs is resisted by the detents, and such tension operates to frictionally hold the detents in effective position.

When a carry is to take place, the cam 411 of the counter 490 or 490$^x$ of lower denomination, whose capacity is exceeded, strikes against and positively displaces the carrying detent 612 or 612$^a$ appropriated to the counter of next higher order, to release the carrying bar 610 or 610$^a$ of said counter of higher order to the action of its spring 680.

The released bar advances until arrested by the carry-restoring bar 613 which is in its intermediate position at that time, and prevents complete operation of the carrying bar, but the advance of the latter would reduce the tension stored in its carrying spring 680, so that when the counters finally mesh with the carrying racks 610$^p$, and the carrying bar 610, or 610$^a$ is freed for complete operation, the relaxed spring must still be strong enough to drive the said counter of higher denomination, one step.

This would be readily effected where the counter of higher denomination registers some other digit than its capacity, as 9 in the decimal system.

But assuming that it does register its capacity, the relaxed carrying spring 680, working through its carrying bar 610, or 610$^a$, its counter 490, or 490$^x$, and the corresponding cam 411, must displace the coacting detent 612 or 612$^a$ of the counter of still higher order against the frictional pressure of the normally tensioned spring 680 exerted through the shoulder 612$^p$ of the carrying bar against such last-named detent.

Obviously, the tension stored in the active spring of lower order would be gradually reducing as it takes up the slight play in the train of mechanism above set forth to turn its counter, and in the actual rotation of the counter as well, so that by the time it commenced to force its corresponding cam 411 against the detent 612 or 612$^a$ of the higher order, its tension would be considerably reduced, as compared to the tension of the carrying spring of next higher order, and its action might be sluggish.

Therefore, to render the carrying action, snappy and quick, especially in cross-carrying operations, as well as to avoid grading the springs 680, we arrange the anchor plate 923 at an incline across the machine, as shown in Fig. 8, to thereby increase the tension of 'the springs by equal increments successively, from left to right, whereby the strongest springs 680 are those adapted to effect the carrying operations from the units to the tens counters, the next stronger springs effect carries from the tens to the hundreds, and so on.

The positioning bars 310 and their drive members 410 arrive at their home positions during the return stroke of the main drive shaft 200, prior to the disengagement of the counters 490, or 490$^x$ from the drive members. Such disengagement is effected through a slight farther travel of the main drive shaft, and to prevent the latter, during such additional travel, from effecting a change in the positions of the bars 310 and drive members 410, we form the inner or rear ends of the cam slots 220$^m$ on an arc corresponding to the arc traversed by the suspension bar rolls 340$^d$ so that the latter may complete their return stroke and the trip rod 303 carried by the suspension arms 323 may disengage the counters from their drive members 410 and engage them with the counter control racks 610$^p$, by raising the props 319, without raising the levers 220 past the point necessary to retire the positioning bars 310 and drive members 410 to their positions of rest.

*Counter-selecting mechanism.*

So far as the description has been carried at present, the plurality of sets of accumulators 490 and 490$^x$ would simultaneously engage and disengage the racks or drive members 410.

In order to prevent such simultaneous operation, a counter-selecting-means is provided whereby the operator may select any set of accumulators for operation, independently of the other, or may adjust the controlling mechanism to retain all sets of counters inactive.

Referring to Figs. 1, 8 and 9, the rock shaft 402 journaled in the side frames 969$^a$, supports at each end a counter-selecting member 418, 418$^a$, respectively, fixed to the shaft and projecting upwardly between the counter axles 400. The heads 418$^m$ of the respective selecting members 418, 418$^a$ are of sufficient width to extend the projecting ends of both counter axles 400 and studs 458, when the latter are in normal elevated position, and the members 418, 418$^a$ are in their intermediate positions, to lock the counters out of engagement with their racks 410, even' though the main drive shaft is operated to draw the sustaining plates 324 downwardly, as heretofore explained.

During an operation of the machine, when the counter-selecting members 418, 418$^a$ are in their intermediate positions, the counter axles 400 and studs 458 rest upon the broad heads 418$^m$ of the selecting members, which maintain the counters out of mesh with their drive racks 410.

A handle or lever 418$^p$ projects upwardly from the head 418$^m$ of one of the counter-selecting members, to enable the operator to shift the members forwardly or backwardly at will, and thereby withdraw the members from beneath one or another of the axles 400 and studs 458 to release one or another of the sets of counters for operation. The axle 400 and stud 458 of the freed or active set of counters will then rest upon the oppositely located sustaining plates 324 to enable the counters to be engaged and disengaged relatively to the racks or drive members 410.

Opposed slots 418$^r$ formed in the respective heads 418$^m$ of the locking or selecting members, embrace the axle 400 and stud 458 at the opposite ends of the set of counters which is to be held inactive, to prevent displacement thereof, such slots preferably being slightly arcuate to conform to the throw of the heads 418$^m$ in either direction, so that those portions of the walls of the slots 418$^r$ which contact the axle and stud will be substantially on a plane with the periphery of the axle and stud when the latter are in normal elevated position, throughout the travel of the head from its intermediate position. Therefore, the lever when shifted in either direction, merely interposes the locking members 418, 418$^a$ in the paths of one or another of the axles and studs without affecting the normal positions of the latter and their counters.

The counter-selecting members, when shifted in either direction from their intermediate position, project their heads 418$^m$ farther past the axle and stud of that set of counters which is to be held inactive, the heads passing completely out of the path of the axle and stud of that set of counters selected for operation.

The members forming each pair of latches 324$^b$ pivotally mounted on the oppositely projecting ears 324$^p$ of the respective sustaining plates 324, and heretofore referred to, are connected by springs 388, and tend to lay hold of the ends of the axles 400 and studs 458 of the respective sets of accumulators, to lock one or another set of accumulators fast to the sustaining plates and thus positively effect the engagement and disengagement of the selected set of counters relatively to their drive members 410.

The heads 418$^m$ of the locking members 418, 418$^a$ lie between the latches 324$^b$, which contact the opposite edges thereof. The heads 418$^m$ are sufficiently wide so that when the locking members are in their intermediate position, they maintain both sets of latches disabled, as shown in Fig. 9, but when the heads are shifted to either of their opposite limits of travel, they release one or another of the sets of latches 324$^b$ cooperating with the respective counter axles 400 and studs 458, and the springs 388 cause the released pair of latches to follow the retreating head until the latches engage their proper axle and stud to secure the selected set of counters to the sustaining plates 324.

*Control of carrying mechanism from the counter-selecting device.*

It will be remembered that the carrying members 610, 610$^a$ (Figs. 2–6, 8, 10 and 11), for the respective sets of counters 490, 490$^x$ are tripped on the return stroke, and reset by the carry-restoring member 613, near the end of the succeeding forward stroke.

In the use of the machine, it may very likely happen that the operator will adjust the counter-selecting heads 418$^m$ from one to another of their extreme positions while one or more of the carrying members 610, 610$^a$ of the set of counters locked out of operation by such adjustment, are discharged. Such a contingency would occur when listing separate amounts alternately and successively on the respective sets of counters.

Obviously, an attempt to reset the discharged carrying members while the corresponding counters are in mesh therewith, as when a set of counters is restrained from operation by the selecting heads, would reversely rotate the coresponding counters, and render the accumulation thereon inaccurate.

To prevent this, we arrange to control the carry-resetting member 613 from the counter-selecting lever 418$^p$ as follows—

The carry-resetting member 613, (Figs. 8–11) is mounted to slide endwise on its supporting cross rail 690, and is notched, as at 613$^m$, at points opposite the diverging forward ends of the denominational pairs of carrying members 610, 610$^a$, the width of the notches being greater than the distance overall the diverging ends of each pair of carrying members.

An arm 418$^x$ projects forwardly from the counter-selecting lever 418$^p$, into proximity to a double cam surface preferably formed on a bracket 611 secured to one end of the carry-resetting member 613 and overhanging the rail 690. The cams 611$^w$ and 611$^x$ occupy a stepped relation to each other, and merge into dwell portions 611$^y$ and 611$^z$. The dwell 611$^y$ is located between the cams 611$^w$ and 611$^x$. The carry-resetting bar is slotted, as at 613$^p$ (Fig. 8), to accommodate the guide pins 651 mounted in the supporting rail 690, the bar-retracting springs 685$^d$ heretofore referred to in describing the carry, being conveniently secured to such pins. A spring 685$^b$ connects a pin 563$^d$ on the carry-resetting member 613 with a pin 654$^m$ mounted on the rail 690 and projecting through one of the slots 613$^p$ in the carry-resetting member 613, to return the carry-resetting bar to, and hold it yieldingly at one end of its endwise travel (Fig. 8).

The carry-resetting bar 613 occupies its extreme right hand position, or that shown in Fig. 11, when the counter-selecting head 418$^m$ is in its rearward adjustment, to release the forward set of counters 490 for operation and retain the rearward or credit set out of operation. In such adjustment, the arm 418$^x$ is withdrawn from contact with the cams 611$^w$ and 611$^x$, thereby freeing the carry-resetting member 613 to the action of the spring 685$^b$ which shifts the member to the right until arrested by the right hand supporting arm 611$^d$, with the notches 613$^m$ so positioned relatively to the pairs of carrying members 610, 610$^a$ that the unnotched portions of the resetting bar will, in operation, strike the offset ends of the carrying members 610$^a$ coacting with the counters 490. On the other hand, the notches 613$^m$ will fit over and embrace the offset ends of the carrying members 610 cooperating with the set of counters 490$^x$ held out of operation by the counter-selecting heads 418$^m$, so that no motion is transmitted thereto.

Shifting the counter-selecting heads 418$^m$ from their rearward to their intermediate position (Figs. 8 and 9), advances the controlling arm 418$^x$ against the rear cam 611$^w$ on the bracket 611 to force the carry-resetting member 613 partway to the left against the tension of its spring 685$^b$, to locate the notches 613$^m$ in position to embrace the forward ends of both sets of carrying members 610, 610$^a$, so that no resetting action can take place when the counter-selecting heads lock the sets of counters out of operation.

This position of the carry-resetting member 613 is determined by the dwell portion 611$^y$ onto which the end of the arm 418$^x$ rides, as shown in Fig. 8.

Adjustment of the counter-controlling heads 418$^m$ to their forward positions, (Fig. 10) advances the arm 418$^x$ against the cam edge 611$^x$ and onto the dwell 611$^z$ to shift the carry-resetting member 613 still farther to the left, to locate the notches 613$^m$ in such position that they will accommodate the carrying members 610$^a$ only, and permit the resetting bar to return the members 610 coacting with the counters 490$^x$ released for operation by this adjustment of the heads 418$^m$.

The arm 418$^x$ is preferably slotted, as at 418$^y$ (Fig. 9) to embrace and be guided by the front cross rod 600.

The particular arrangement and location of the cams 611$^w$ and 611$^z$ is merely illustrative, and we do not wish to be limited to the exact construction shown.

The foregoing illustrates one embodiment of our invention, it being understood that changes may be made in the form, arrangement and construction of the various novel features; that their mode or time of operation may be varied, and that features may be omitted without departing from the spirit and scope of our invention.

What we claim as new, is:—

1. In a calculating machine, the combination with several sets of denominational counters; of carrying mechanisms therefor, including individual carrying members for the tens and higher denominational counters in each set, the like-denominational carrying members being arranged side by side in groups; counter-controlled means to trip the carrying members; and a resetting means for the members.

2. In a calculating machine, the combination with several sets of denominational counters; of a corresponding number of carrying mechanisms therefor, including individual carrying members for the tens and higher denominational counters in each set; counter-controlled means to trip the carrying members; and a single resetting means common to the several carrying mechanisms.

3. In a calculating machine, the combination with several sets of denominational counters; of a corresponding number of carrying mechanisms therefor, including individual carrying members for the tens and higher denominational counters in each set; counter-controlled means to trip the carrying members; and a single resetting means common to the several carrying mechanisms, and adjustable to operate on any of the sets of carrying mechanisms singly.

4. In a calculating machine, the combination with several sets of denominational counters; and a counter-selecting means to control the operativeness of the sets of counters; of a corresponding number of carrying mechanisms, including individual carrying members for the tens and higher denominational counters in each set; counter-controlled means to trip the carrying members; and an adjustable carry-resetting member controlled by the counter-selecting means.

5. In a calculating machine, the combination with several sets of denominational counters; and a counter-selecting means to control the operativeness of the sets of counters; of a corresponding number of carrying mechanisms, including individual carrying members for the tens and higher denominational counters in each set; counter-controlled means to trip the carrying members; and a carry-resetting bar having notches adjustable to aline with one or another of the carrying mechanisms to prevent the resetting of one of such carrying mechanisms while resetting the other.

6. In a calculating machine, the combination with several sets of denominational counters; and a counter-selecting means to control the operativeness of the sets of counters; of a corresponding number of carrying mechanisms, including individual carrying members for the tens and higher denominational counters in each set; counter-controlled means to trip the carrying members; and a notched carry-resetting bar, adjustable to aline the notches with one or another or all of the carrying mechanisms.

7. In a calculating machine, the combination with several sets of denominational counters; and a counter-selecting means to retain inactive, one or another, or all of said sets of counters; of sets of carrying mechanisms corresponding with the several sets of counters, and including individual carrying members; counter-controlled means to trip the carrying members; and an adjustable carry-resetting member controlled by the counter-selecting means to be ineffective as to the carrying mechanisms associated with the inactive sets of counters.

8. In a calculating machine, the combination with several sets of denominational counters; and a corresponding number of sets of carrying mechanisms, including individual carrying members; of a counter-selecting means adapted to render one or another of the sets of counters inactive; and a single carry-resetting member common to the several sets of carrying mechanisms and adjustable by the counter-selecting means to be ineffective as to the inactive set of counters.

9. In a calculating machine, the combination with several sets of denominational counters; and counter-selecting means to determine which of said sets shall register accumulations; of sets of carrying mechanisms corresponding to the number of sets of counters, and including individual carrying members for the tens and higher denominational counters of each set; a single shiftable carry-resetting member common to the several sets of carrying mechanisms; means to normally retain the carry-resetting member at one end of its travel, in position to restore the individual members of one of said carrying mechanisms only, said carry-resetting member adjustable to a position to restore the individual members of another of said carrying mechanisms.

10. In a calculating machine, the combination with several sets of denominational counters; and counter-selecting means to determine which of said sets shall register accumulations; of sets of carrying mechanisms corresponding to the number of sets of counters, and including individual carrying members for the tens and higher denominational counters of each set; a single shiftable carry-resetting member common to the several sets of carrying mechanisms; means to normally retain the carry-resetting member at one end of its travel, in position to restore the individual members of one of said carrying mechanisms only, said carry-resetting member adjustable to a position to restore the individual members of another of said carrying mechanisms, and prevent the restoration of the members of the first-named carrying mechanism.

11. In a calculating machine, the combination with several sets of denominational counters; carrying mechanisms for the respective sets of counters; counter-controlled means to trip the carrying mechanisms; and a counter-selecting means to determine which of said sets of counters shall register accumulations; of a single carry-resetting member common to at least two of the sets of carrying mechanisms, and adjustable with the counter-selecting means to cooperate with the carrying mechanism of the active set of counters.

12. In a calculating machine, the combination with several sets of denominational counters; carrying mechanisms for the respective sets of counters; counter-controlled means to trip the carrying mechanisms; and a counter-selecting means to determine which of said sets of counters shall register accumulations; of a single carry-resetting member common to at least two of the sets of carrying mechanisms; and a shifter device controlled by the counter-selecting means to adjust the carry-resetting member to operative position relatively to one or another set of carrying mechanisms.

13. In a calculating machine, the combination with several sets of denominational counters; carrying mechanisms for the respective sets of counters; counter-controlled means to trip the carrying mechanisms; and a counter-selecting means to determine which of said sets of counters shall register accumulations; of a single adjustable carry-resetting member common to at least two of the sets of carrying mechanisms; means tending to retain the carry-resetting member in, and return it to, one of its adjusted positions; and a shifter device operated from the counter-selecting means, to control the adjustment of the carry-resetting member.

14. In a calculating machine, the combination with several sets of denominational counters; carrying mechanisms for the respective sets of counters; counter-controlled means to trip the carrying mechanisms; and a counter-selecting means to determine which of said sets of counters shall register accumulations; of a single adjustable carry-resetting member common to at least two of the sets of carrying mechanisms; means tending to retain the carry-resetting member in, and return it to, one of its adjusted positions; and a shifter device to control the adjustment of the carry-resetting member.

15. The combination in a calculating machine, having a set of denominational counters; and drive members therefor, engaged and disengaged by the counters; of a carrying mechanism, including carrying members engaged by the counters when the latter are disengaged from their drive members; means tending to shift the carrying members to discharged position; detents engaged with the carrying members to retain them in set position; counter-controlled means acting directly upon the detents to disable the latter; and a carry-resetting member adapted to arrest the tripped carrying members until the engagement of the counters and carrying members, and to reset the tripped carrying members after the disengagement of the counters and carrying members.

16. In a calculating machine, the combination with denominational counters; and drive members therefor; of a carrying mechanism; and a carry-resetting member shiftable into and out of effective relation to the carrying mechanism.

17. In a calculating machine, the combination with denominational counters; and drive members therefor; of a carrying mechanism, including individual carrying members for the counters; means to trip the carrying members to enable a carrying operation to take place; a notched resetting member normally adapted to contact the tripped carrying members to cock the latter, and shiftable to aline the notches with the carrying members.

18. In a calculating machine, the combination with at least two sets of denominational counters; and drive members therefor; of a carrying mechanism for each set of denominational counters, each carrying mechanism including individual carrying members for the respective counters; means to trip the carrying members to enable a carrying operation to take place; a notched resetting member normally adapted to contact the tripped carrying members of one carrying mechanism to cock such members, the resetting member being shiftable to aline its notches with the carrying members of one or another of the carrying mechanisms to prevent effective operation of the resetting member relatively to such carrying mechanisms.

19. The combination in a calculating machine, with denominational counters; and drive members therefor; of a carrying mechanism; a carry-resetting member; non-add mechanism; and means controlled thereby to prevent the effective operation of the carry-resetting member.

20. The combination in a calculating machine, with denominational counters; and drive members therefor; of a carrying mechanism; a shiftable carry-resetting member; non-add mechanism; and means controlled thereby to shift the carry-resetting member to effective or ineffective position.

21. The combination in a calculating machine, with denominational counters; and drive members therefor; of a carrying mechanism; a shiftable carry-resetting member; non-add mechanism; and means operable coincidently with the non-add mechanism to adjust the carry-resetting member for ineffective operation.

22. In a calculating machine, the combination with several sets of denominational counters; of carrying mechanisms for the respective sets of counters, including individual carrying members, arranged in denominationally corresponding groups, with divergent ends; and a notched carry-resetting member adjustable to aline the notches with one or another of the sets of carrying members to render the resetting member ineffective relatively to such carrying members.

23. In a calculating machine, the combination with several sets of denominational counters; and carrying mechanisms for the respective sets of counters; of a combined non-add and counter-selecting mechanism to render one of the sets of counters inactive and another active; and a carry-resetting member common to the carrying mechanisms of the respective counters, and adjustable by the combined non-add and counter-selecting mechanism to coact with the carrying members of that set of counters selected for active operation, and adapted for adjustment to be wholly ineffective when the sets of counters are wholly inactive.

24. In a calculating machine, the combination with denominational counters; and carrying mechanism therefor; of a carry-resetting mechanism, including a swinging frame; means to actuate the frame; and a carry-resetting member adjustably mounted on the frame, and adapted to assume effective or ineffective positions relatively to the carrying mechanism.

25. In a calculating machine, the combination with denominational counters; and carrying mechanism therefor; of a carry-resetting mechanism, including a swinging frame, having a cross rail; means to actuate the frame; a carry-resetting member slidably mounted on the rail, to occupy effective or ineffective position relatively to the carrying mechanism; a spring to hold the resetting member in one of its adjusted positions; and means to shift the resetting member to, and retain it in, another of its positions.

26. In a calculating machine, the combination with a series of counters; and carrying mechanism therefor; of a carry-resetting mechanism, including swinging arms; a carry-resetting member supported by the arms; a link and lever to swing the arms in one direction; drive means having a loose connection with the link; locking means to retain the carry-resetting member temporarily in one of its positions; and a trip member to control the lock.

27. In a calculating machine, the combination with a series of counters; and a carrying mechanism therefor; of a carry-resetting member; means to actuate the carry-resetting member towards and from the carrying mechanism; means to normally retain the carry-resetting member at one extreme of its travel, including a stepped locking bar for the carry-resetting member, to arrest the latter in a position intermediate its extremes of travel, after the carrying mechanism has been reset; and a trip member to control the locking bar.

28. In a calculating machine, the combination with counters; and a carrying mechanism therefor; of a shiftable carry-resetting member; means to actuate the carry-resetting member towards and from the carrying mechanism, including a driving element; a link having a loose connection with the driving element; and a thrust member to shift the carry-resetting member; a locking bar to engage the link and hold the carry-resetting member at one of its extremes of travel; and a trip member in control of the locking member, to enable it to releasably maintain the carry-resetting member in an intermediate position on its return from its opposite extreme of travel; the trip member, upon its return to normal position, adapted to restore the locking member, to enable the carry-resetting member to resume its idle position.

29. In a calculating machine, the combination with several sets of denominational counters; of carrying mechanisms therefor, including individual carrying members for the tens and higher denominational counters in each set, the like-denominational carrying members for the respective sets of counters, being arranged side by side in groups; counter-controlled means to trip the carrying members; and a single resetting means common to the carrying members of each set of counters.

ARTHUR PENTECOST.
WILLIAM W. FISHER.

Certificate of Correction.

It is hereby certified that in Letters Patent No. 1,433,908, granted October 31, 1922, upon the application of Arthur Pentecost, of New York, N. Y., and William W. Fisher, of Orange, New Jersey, for an improvement in "Calculating Machines," errors appear in the printed specification requiring correction as follows: Page 3, line 37, for the word "stubs" read *studs;* page 4, line 29, for the reference numeral "548" read *458;* page 9, line 55, after the word "extend" insert the word *beneath;* and that the said Letters Patent should be read with these corrections therein that the same may conform to the record of the case in the Patent Office.

Signed and sealed this 28th day of November, A. D., 1922.

[SEAL.]                        KARL FENNING,

*Acting Commissioner of Patents.*